(12) United States Patent
Kim et al.

(10) Patent No.: US 9,077,531 B2
(45) Date of Patent: Jul. 7, 2015

(54) HYBRID AUTOMATIC REPEAT REQUEST AND CHANNEL INFORMATION FEEDBACK FOR RELAY

(75) Inventors: Hak Seong Kim, Anyang-si (KR); Eun Sun Kim, Anyang-si (KR); Byeong Geol Cheon, Anyang-si (KR); Bong Hoe Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 843 days.

(21) Appl. No.: 12/585,846

(22) Filed: Sep. 25, 2009

(65) Prior Publication Data
US 2010/0077274 A1    Mar. 25, 2010

Related U.S. Application Data

(60) Provisional application No. 61/100,234, filed on Sep. 25, 2008.

(51) Int. Cl.
| | |
|---|---|
| H04B 7/15 | (2006.01) |
| H04L 1/18 | (2006.01) |
| H04L 1/00 | (2006.01) |
| H04L 1/06 | (2006.01) |
| H04L 1/16 | (2006.01) |
| H04B 3/36 | (2006.01) |
| H04B 7/14 | (2006.01) |

(52) U.S. Cl.
CPC ............ *H04L 1/1829* (2013.01); *H04L 1/0026* (2013.01); *H04L 1/06* (2013.01); *H04L 1/1607* (2013.01); *H04L 1/1864* (2013.01); *H04L 1/1887* (2013.01); *H04L 1/1893* (2013.01); *H04L 2001/0097* (2013.01)

(58) Field of Classification Search
CPC . H04W 16/26; H04W 84/047; H04B 7/15542
USPC ....................... 370/315, 329; 455/7
See application file for complete search history.

(56) References Cited

U.S. PATENT DOCUMENTS

| | | | |
|---|---|---|---|
| 6,687,509 B2* | 2/2004 | Schmutz et al. ............... 455/522 |
| 2004/0266339 A1* | 12/2004 | Larsson ............................. 455/7 |
| 2005/0190821 A1* | 9/2005 | Fujii et al. ...................... 375/211 |
| 2006/0040611 A1* | 2/2006 | Ding et al. .................... 455/11.1 |
| 2006/0040616 A1* | 2/2006 | Wheatley ................... 455/67.11 |
| 2006/0270341 A1* | 11/2006 | Kim et al. ........................ 455/16 |
| 2007/0124642 A1* | 5/2007 | Suh et al. ....................... 714/749 |
| 2008/0049718 A1* | 2/2008 | Chindapol et al. ............ 370/351 |
| 2008/0108355 A1* | 5/2008 | Oleszcsuk ...................... 455/442 |
| 2008/0166975 A1* | 7/2008 | Kim et al. ........................ 455/68 |
| 2009/0010198 A1* | 1/2009 | Boariu et al. .................. 370/315 |
| 2009/0191882 A1* | 7/2009 | Kovacs et al. ................. 455/450 |
| 2009/0201889 A1* | 8/2009 | Sundaresan et al. .......... 370/336 |
| 2009/0203309 A1* | 8/2009 | Okuda ............................... 455/7 |
| 2009/0303918 A1* | 12/2009 | Ma et al. ....................... 370/315 |

\* cited by examiner

*Primary Examiner* — Ayodeji Ayotunde
(74) *Attorney, Agent, or Firm* — McKenna Long & Aldridge LLP

(57) ABSTRACT

Operations of a relay are disclosed. To perform a hybrid automatic repeat request (HARQ), the relay receives a plurality of codewords from a base station and transmits a status indicator with respect to the plurality of codewords to the base station. The status indicator is a signal informing the base station about whether or not the configuration of an HARQ has been changed. Although a backhaul link and an access link are asymmetric, HARQ operation can be achieved.

6 Claims, 17 Drawing Sheets

HYBRID AUTOMATIC REPEAT REQUEST AND CHANNEL INFORMATION FEEDBACK FOR RELAY

CROSS-REFERENCE TO RELATED APPLICATIONS

This application claims the benefit of priority of U.S. Provisional Application No. 61/100,234 filed on Sep. 25, 2008 which is incorporated by reference in its entirety herein.

BACKGROUND OF THE INVENTION

1. Field of the Invention

The present disclosure relates to wireless communication and, more particularly, to hybrid automatic repeat request and channel information feedback for a relay in a wireless communication system.

2. Description of the Related Art

ITU-R (International Telecommunication Union-Radio communication sector) is proceeding with a standardization of an IMT (International Mobile Telecommunication)-Advanced, a next-generation mobile communication system following the $3^{rd}$-generation. The IMT-Advanced aims to support IP-based multimedia services at a data transfer rate of 1 Gbps in a pause and low-speed movement state and at a data transfer rate of 100 Mbps in a high-speed movement state.

3GPP ($3^{rd}$ Generation Partnership Project) is preparing an LTE-A (Long Term Evolution-Advanced) as a system standard satisfying the requirements of the IMT-Advanced. The LTE, part of E-UMTS (Evolved-UMTS) using E-UTRAN (Evolved-Universal Terrestrial Radio Access Network), by the 3GPP standardization organization, employs OFDMA (Orthogonal Frequency Division Multiple Access) in downlink and SC-FDMA (Single Carrier-Frequency Division Multiple Access) in uplink. The LTE-A has evolved from the LTE.

The related art wireless communication system such as LTE includes a mobile station (MS) and a base station (BS) providing a service to a cell, a certain area. The quality of a transmission signal is affected by a change in a radio environment in terms of the wireless transmission technique. In particular, a radio channel changes over time due to various types of scatters, the movement of the MS, and the like. In addition, as the distance between radio communication subjects increases, reception power is rapidly reduced, so the distance is restricted. Thus, in general, the MS can communicate with the BS when it is within the coverage of the BS. A maximum transmission speed between the BS and the MS, throughput of users within a cell, and throughput of the entire cell tend to be reduced due to the factors such as the scatters, the movement speed of the MS, the transmission/reception distance, and the like. For example, when the MS is located at a cell boundary, or when an obstacle such as a building or the like is present between the MS and the BS, communication quality between the MS and the BS may not be good.

In an effort to solve such problem, various techniques for compensating degradation of a transmission signal between the BS and the MS can be introduced to obtain effects such as a maximum transmission speed, the improvement of throughput, an extension of coverage, and the like. One of those techniques is introducing of a relay station (RS) in the wireless communication system. The RS is capable of extending the coverage of the BS and enhancing a cell throughput. The LTE-A may include such RS.

When the wireless communication system includes the RS, a link between the BS and the RS and a link between the RS-RS and MS should be all considered.

In addition, in the wireless communication system, the BS, the RS, and the MS may use multiple antennas. When the number of transmission antennas is $n_T$ and the number of reception antennas is $n_R$ in the link between BS and RS and the link between the RS and a relay UE (Re UE), a channel matrix H of each link has a size of $n_R \times n_T$, and a maximum number 'r' of a transmission codeword (CW) (referred to as a 'codeword', hereinafter) that can be simultaneously transmitted at the same frequency theoretically when there is no correlation between antennas is determined by equation shown below:

$$r = \mathrm{rank}(H) = \min(n_T, n_R) \le n_R$$

For example, if the BS uses four transmission antennas and the RS uses four reception antennas, the rank of the link between BS-RS is 4, and maximum four codewords can be simultaneously transmitted or received (here, the rank corresponds to the number of layers).

When the rank is different or the amount of traffic is not balanced in the link between the BS and the RS or in the link between the RS and the Re UE, a method for relaying data by the RS without wasting radio resource is required, and a channel information feedback method in association therewith is also required. In addition, in the above-described case, if the RS does not have a function of performing scheduling by itself, how it performs HARQ matters.

SUMMARY OF THE INVENTION

The present invention provides HARQ and channel information feedback of the relay in a wireless communication system.

In an aspect, a hybrid automatic repeat request (HARQ) performing method of a relay is provided. The method includes receiving a plurality of codewords from a base station (BS), transmitting a status indicator with respect to the plurality of codewords to the BS, relaying the plurality of codewords to a relay user equipment (Re UE); receiving at least one ACK/NACK (Acknowledgement/Not Acknowledgement) with respect to the plurality of codewords from the Re UE, and relaying the at least one ACK/NACK which has been received from the Re UE to the BS, wherein the status indicator is a signal informing the BS about whether or not the configuration of an HARQ has been changed.

In other aspect, a channel information feedback method of a relay is provided. The method includes extracting channel information with respect to a backhaul downlink between a base station (BS) and a relay station (RS) by using a signal received from the BS, transmitting channel information regarding the backhaul downlink to a relay user equipment (Re UE) connected to the RS, receiving integrated channel information from the Re UE, and relaying the integrated channel information to the BS, wherein the integrated channel information is information obtained by estimating a channel between the BS and the Re UE based on the channel information regarding the backhaul downlink and channel information regarding an access downlink between the RS extracted by the re UE and the Re UE.

In another aspect, a channel information feedback method of a relay user equipment (Re UE) is provided. The method includes receiving channel information regarding a backhaul downlink between a base station (BS) and a relay station (RS) from the RS, determining integrated channel information obtained by estimating a channel between the BS and the RS based on the channel information regarding the backhaul downlink, and transmitting the integrated channel information to the RS.

DETAILED DESCRIPTION OF THE PREFERRED EMBODIMENT

In order to clarify the description, a 3GPP LTE/LTE-A will be mainly described but the present invention is not limited thereto. Namely, the present invention may be also applicable to any other wireless communication systems such as, for example, IEEE 802.16M.

Figure 1:
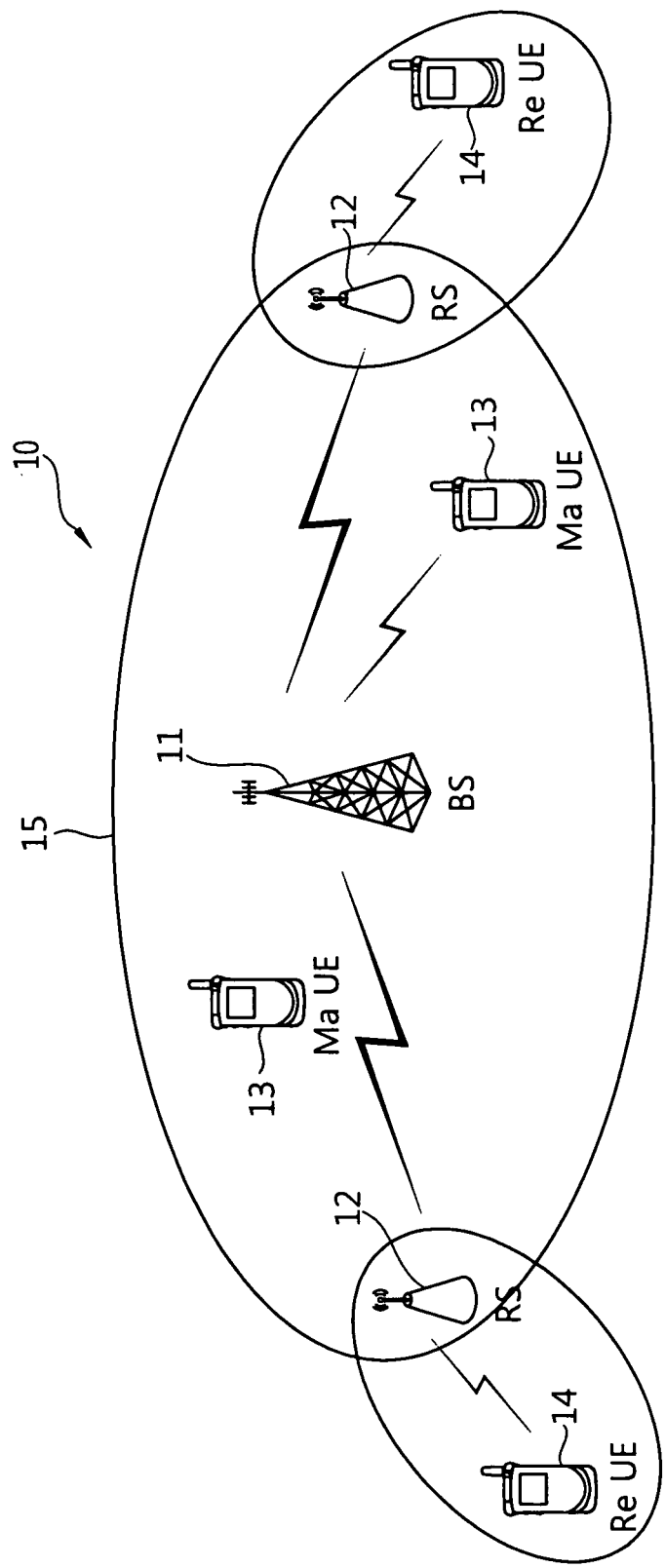
FIG. 1 illustrates a wireless communication system including a relay station.

FIG. 1 illustrates a wireless communication system including a relay station. With reference to FIG. 1, the wireless communication system 10 includes at least one base station (BS) 11. Each base station 11 provides a communication service to a particular geographical area 15 generally called a cell. The cell may be divided into a plurality of areas, and each area is called a sector. One or more cells may exist in a single BS. The BS 11 generally refers to a fixed station communicating with a user equipment (UE) 13, and may be referred to by other names such as evolved Node B (eNB), base transceiver system (BTS), access point (AP), and the like. The BS 11 may perform functions such as connectivity between a relay station (RS) 12 and the UE 14, management, control, and resource allocation.

The RS 12 refers to a device relaying a signal between the BS 11 and the UE 14, and may be called by other names such as a relay node (RN), a repeater, a relay, and the like.

RSs may be classified into several types according to their function as shown in Table 1 below:

TABLE 1

| function | L1 Relay | L2 Relay | L3 Relay | Pico/Femto Cell |
|---|---|---|---|---|
| RF function | X | X | X | X |
| Coder/Decoder and CRC | — | X | X | X |
| HARQ | — | X | X | X |
| Multiplex & Demultiplex of MAC SDU | — | X | X | X |
| Priority(QoS) handling | — | X | X | X |
| Scheduling | — | X | X | X |
| Outer ARQ | — | (X) | X | X |
| (Re)-Segmentation and concatenation | — | (X) | X | X |
| Header compression(ROHC) | — | — | — | X |
| Reordering of lower layer SDUs | — | — | — | X |
| In-sequence delivery of upper layer PDUs | — | — | — | — |
| Duplicate detection of lower layer SDUs | — | — | — | X |
| Ciphering | — | — | — | X |
| System information broadcast | — | — | X | X |
| RRC Connection set-up and maintenance | — | — | X | X |
| Radio Bearers set-up and maintenance | — | — | — | X |
| Mobility function | — | — | X | |
| MBMS services control | — | — | — | X |
| Paging | — | — | — | X |
| QoS management | — | — | (X) | X |
| UE measurement reporting and control the reporting | — | — | (X) | X |
| NAS signaling handling | — | — | — | X |

In Table 1, 'X' indicates that a corresponding function is supported, and '(X)' indicates that a corresponding function can be supported. '-' indicates that a corresponding function is not supported. In Table 1, the RSs are classified into L1, L2, and L3 RSs, which are, however, merely illustrative. This classification is made according to the schematic characteristics of the L1, L2, and L3 RSs (i.e., L1, L2, and L3 relays) and not be necessarily consistent with the terms. For reference, Table 1 proposes the functions of a femto cell or a pico-cell. In this case, it is assumed that the femto cell or the pico-cell supports every function illustrated in Table 1. The L1 RS (or L1 relay), an RS having some additional functions in addition to amplify and forward (AF), amplifies a signal which has been received from the BS or the UE and transfers the amplified signal to the UE or the BS. Hereinafter, the L1 RS is a relay that cannot perform an independent scheduling function. The L2 RS (or L2 relay) is a relay having a scheduling function together with decoding and forwarding (DF). That is, the L2 RS recovers information of a signal which has been received from the BS or the UE, through a process such as a demodulation and decoding operation, generates a signal through a process such as a coding and modulation process, and transfers the same to the UE or the BS. The L3 RS (or L3 relay) is a relay having a similar form to a single cell, supporting functions of a call connection, call release, and mobility together with the function of the L2 RS.

The UEs 13 and 14 may be may be fixed or mobile, and may be referred to by other names such as mobile station (MS), user terminal (UT), subscriber station (SS), wireless device, personal digital assistant (PDA), wireless modem, handheld device, access terminal (AT), etc. Hereinafter, the macro UE (Ma UE) 13 will be referred to as a UE that directly communicates with the BS 11, while the relay UE (Re UE) 14 will be referred to as a UE that communicates with an RS. Although the Ma UE 13 is within the cell coverage of the BS 11, it may communicate with the BS 11 via the RS 12 to improve a transmission speed according to a diversity effect.

Hereinafter, downlink (DL) refers to communication from the BS 11 to the Ma UE 13, and uplink (UL) refers to communication from the Ma UE 13 to the BS 11. A backhaul link refers to a link between the BS 11 and an RS, a backhaul downlink refers to communication from the BS 11 to the RS, and a backhaul uplink refers to communication from the RS 12 to the BS 11. An access link refers to a link between the RS 12 and the Re UE 14, an access downlink refers to communication from the RS 12 to the Re UE 14, and access uplink refers to communication from the Re UE 14 to the RS 12.

In the above-described wireless communication system, a multi-antenna technique or MIMO may be used. The multi-antenna technique and the MIMO use multiple transmission antennas and at least one reception antenna. The MIMO includes a spatial diversity that transmits the same streams to multiple layers, and spatial multiplexing that transmits multiple streams to multiple layers. In the spatial multiplexing, transmission of multiple streams to a single user is called a single user-MIMO (SU-MIMO) or a spatial division multiple access (SDMA). In the spatial multiplexing, transmission of multiple streams to a plurality of users is called a multi-user-MIMO (MU-MIMO).

Figure 2:
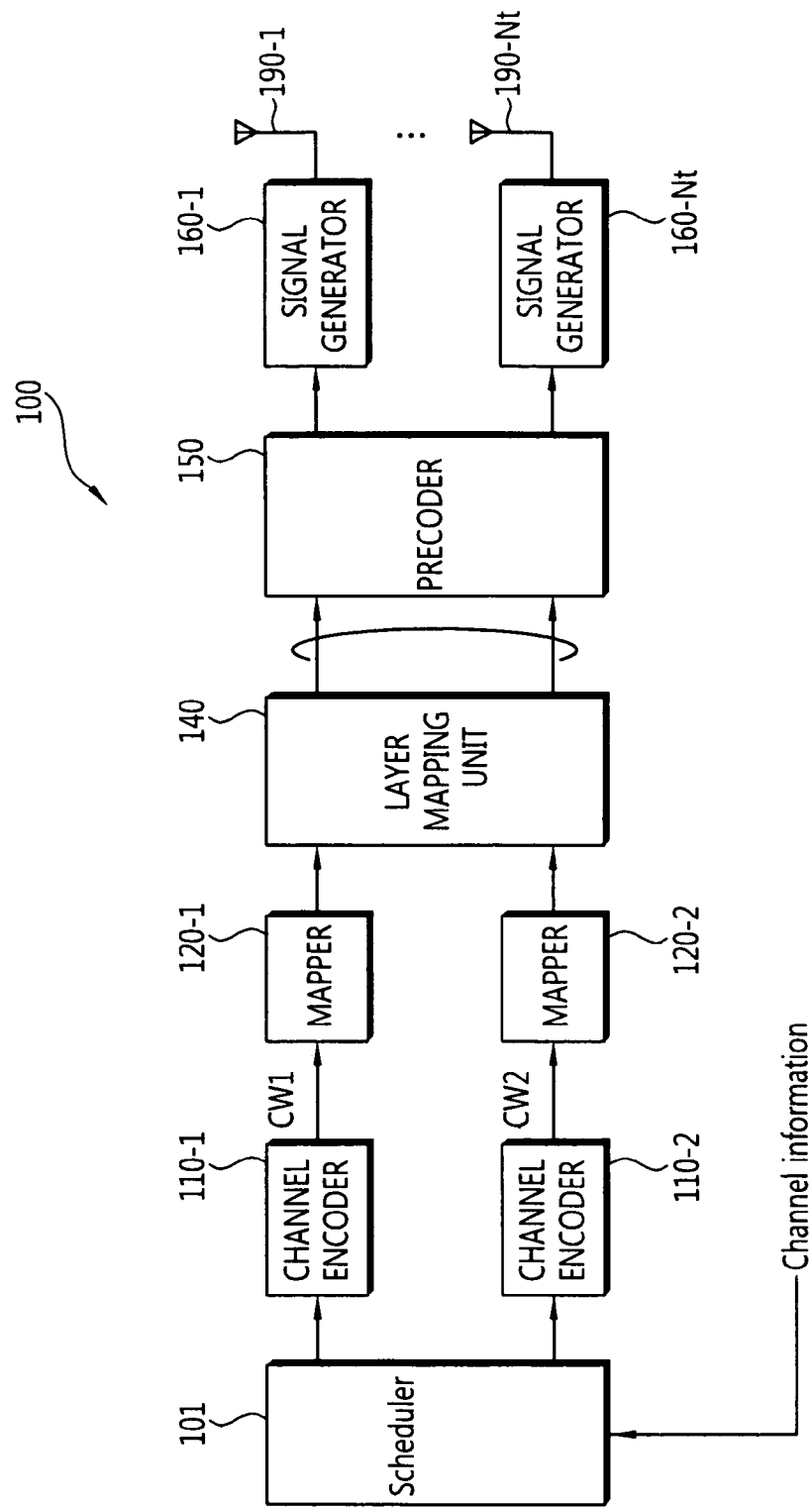
FIG. 2 illustrates a transmitter having multiple antennas.

FIG. 2 illustrates a transmitter having multiple antennas. With reference to FIG. 2, the transmitter 100 may include a scheduler 101, channel encoders 110-1 and 110-2, mappers 120-1 and 120-2, a layer mapping unit 140, a precoder 150, and signal generators 160-1 and 16-Nt. Nt is the number of transmission antenna ports. The scheduler 101 may receive channel information and perform a modulation scheme, a radio resource allocation, power control, and the like. The channel encoders 110-1 and 110-2 may encode inputted information bits according to a predetermined coding scheme to generate codewords. The first channel encoder 110-1 generates a first codeword CW1, and the second channel encoder 110-2 generates a second codeword CW2.

The mappers 120-1 and 120-2 modulate each codeword according to a modulation scheme and map the modulated codewords to modulation symbols having a demodulation value. There is no limitation in the modulation scheme, and the modulation scheme may be m-PSK (m-Phase Shift Keying) or m-QAM (m-Quadrature Amplitude Modulation). For example, m-PSK may be BPSK, QPSK, or 8-PSK, and m-QAM may be 16-QAM, 64-QAM, or 256-QAM. The first mapper 120-1 generates modulation symbols with respect to the first codeword CW1, and the second mapper 120-2 generates modulation symbols with respect to the second codeword CW2.

Here, in order to process the two codewords CW1 and CW2, the transmitter 100 includes the two channel encoders 110-1 and 110-2 and two mappers 120-1 and 120-2, but the number of channel encoders and mappers included in the transmitter 100 is not limited. The transmitter 100 may include at least one channel encoder and at least one mapper in order to process at least one codeword.

The layer mapping unit 140 maps the modulation symbols of the inputted codewords CW1 and CW2 to each layer according to the number of the layers. The layers may be paths of information input to the precoder 150, which correspond to rank values. The layer mapping unit 140 may determine the number of layers (namely, the ranks) and map the modulation symbols of the respective codewords to each layer.

The precoder 150 processes the symbols which have been mapped to each layer according to the MIMO scheme based on a plurality of antenna ports 190-1, ..., 190-Nt, and outputs antenna specific symbols. The signal generators 160-1, ..., 160-Nt convert the antenna specific symbols into transmission signals. The transmission signals are transmitted via the antenna ports 190-1, ..., 190-Nt. The signal generators 160-1, ..., 160-Nt may generate the transmission signals through a method well known to the skilled person in the art such as OFDM modulation, SC-FDMA modulation, and the like.

The transmitter 100 may support a hybrid automatic repeat request (HARQ). In case of re-transmission for the HARQ, the transmitter 100 may perform the same layer mapping as that for the initial transmission, or may perform a different layer mapping for the re-transmission. In addition, the transmitter 100 may support rank adaptation that changes ranks according to a channel state.

According to a paragraph 6.3 of 3GPP TS 36.211 V8.0.0 (2007-09), in the 3GPP LTE, modulation symbols $d^{(q)}(0), \ldots, d^{(q)}(M^{(q)}_{symb}-1)$ with respect to a codeword q are mapped to $x(i)=[x^{(0)}(i) \ldots x^{(v-1)}(i)]^T$ ($i=0, 1, \ldots, M^{layer}_{symb}-1$). Here, 'x' is a symbol after mapping, $M^{(q)}_{symb}$ is the number of modulation symbols with respect to the codeword q, v, is the number of layers, and $M^{layer}_{symb}$ is the number of modulation symbols per layer. Table 2 below shows mapping between the codewords and the layers for the spatial multiplexing.

TABLE 2

| Number of layers | Number of code words | Codeword-to-layer mapping $i = 0, 1, \ldots, M^{layer}_{symb} - 1$ | |
|---|---|---|---|
| 1 | 1 | $x^{(0)}(i) = d^{(0)}(i)$ | $M^{layer}_{symb} = M^{(0)}_{symb}$ |
| 2 | 2 | $x^{(0)}(i) = d^{(0)}(i)$<br>$x^{(1)}(i) = d^{(1)}(i)$ | $M^{layer}_{symb} = M^{(0)}_{symb} = M^{(1)}_{symb}$ |
| 2 | 1 | $x^{(0)}(i) = d^{(0)}(2i)$<br>$x^{(1)}(i) = d^{(0)}(2i+1)$ | $M^{layer}_{symb} = M^{(0)}_{symb}/2$ |
| 3 | 2 | $x^{(0)}(i) = d^{(0)}(i)$<br>$x^{(1)}(i) = d^{(1)}(2i)$<br>$x^{(2)}(i) = d^{(1)}(2i+1)$ | $M^{layer}_{symb} = M^{(0)}_{symb} = M^{(1)}_{symb}/2$ |
| 4 | 2 | $x^{(0)}(i) = d^{(0)}(2i)$<br>$x^{(1)}(i) = d^{(0)}(2i+1)$<br>$x^{(2)}(i) = d^{(1)}(2i)$<br>$x^{(3)}(i) = d^{(1)}(2i+1)$ | $M^{layer}_{symb} = M^{(0)}_{symb}/2 = M^{(1)}_{symb}/2$ |

Figure 3:
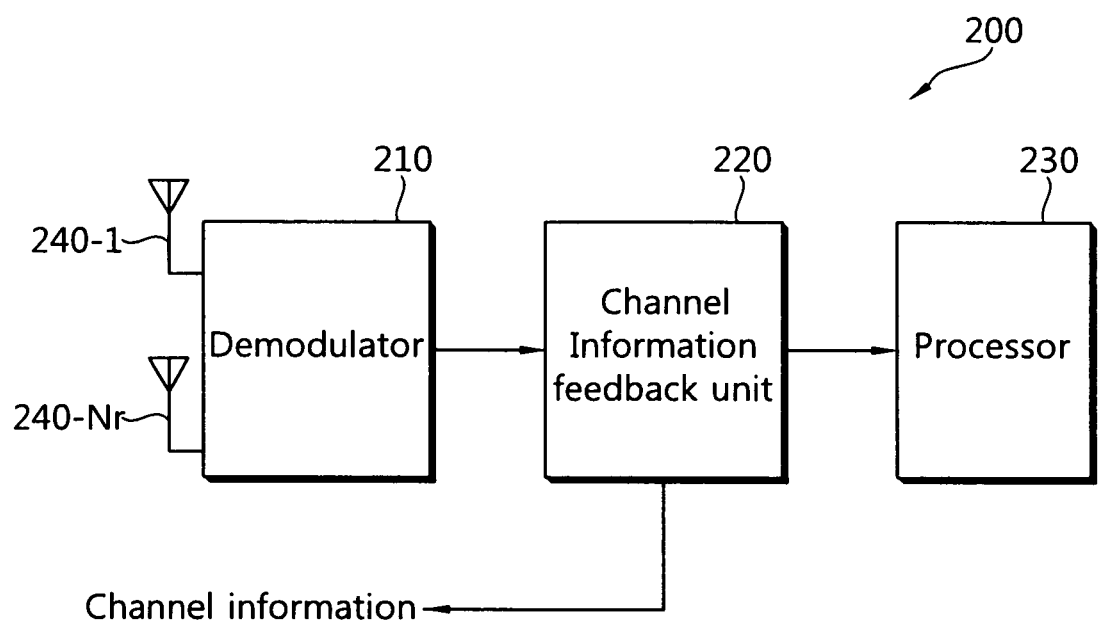
FIG. 3 illustrates a receiver having multiple antennas.

FIG. 3 illustrates a receiver having multiple antennas.

With reference to FIG. 3, the receiver 200 may include a demodulator 210, a channel information feedback unit 220, and a processor 230. Nr is the number of reception antenna ports.

The demodulator 210 demodulates a transmission signal received via reception antennas 240-1, . . . , 240-Nr. The channel information feedback unit 220 generates channel information and feeds it back to the transmitter 100. The processor 230 decodes the demodulated transmission signal. The transmitter 100 and/or the receiver 200 as described above may be a part of the BS, the RS, and the Re UE.

An HARQ performing method and channel information feedback method of the RS will now be described.

In the backhaul link and the access link of the wireless communication system, if the number of layers and/or the number of transmissible codewords are equal, although an RS does not perform an independent scheduling function, namely, although the RS performs only the function of the L1 RS, it may perform HARQ of the wireless communication system without any problems.

Figure 4:
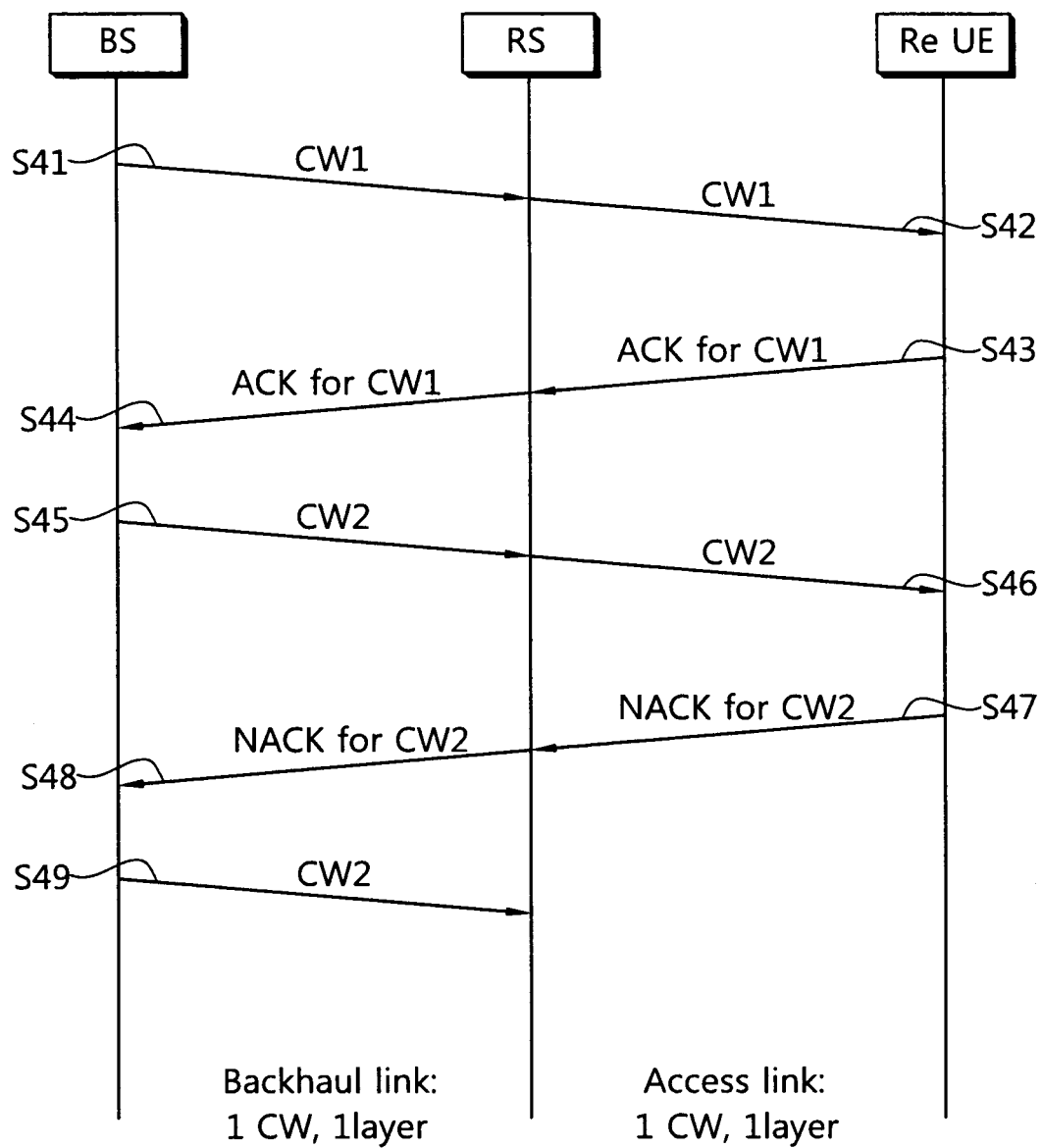
FIG. 4 illustrates performing HARQ in the wireless communication system when the number of transmissible codewords in a backhaul link and that in an access link are equal.

FIG. 4 illustrates performing HARQ in the wireless communication system when the number of transmissible codewords of the backhaul link and that of the access link are equal. Here, it is assumed that the RS performs only the function of the L1 RS.

With reference to FIG. 4, when the RS receives the first codeword CW1 from the BS (S41), the RS transmits the first codeword CW1 to the Re UE by applying the same mapping rule as that applied to mapping between the codewords and layers in the backhaul link (S42). When the RS receives an ACK (Acknowledgement) with respect to the first codeword CW1 from the Re UE (S43), the RS relays the received ACK to the BS (S44). When the RS receives the second codeword CW2 from the BS (S45), the RS transmits the second codeword CW2 to the Re UE by applying the same mapping rule as that applied to mapping between the codewords and layers in the backhaul link (S46). If the RS receives a NACK (Not Acknowledgement) with respect to the second codeword CW2 from the Re UE (S47), the RS relays the received NACK to the BS (S48). Upon receiving the NACK with respect to the second codeword CW2, the BS retransmits the second codeword CW2 to the RS (S49).

Unlike the case as described above, if the number of layers and/or the number of transmissible codewords in the access link and that of the backhaul link are not equal, it is difficult to perform HARQ in the wireless communication system.

Figure 5:
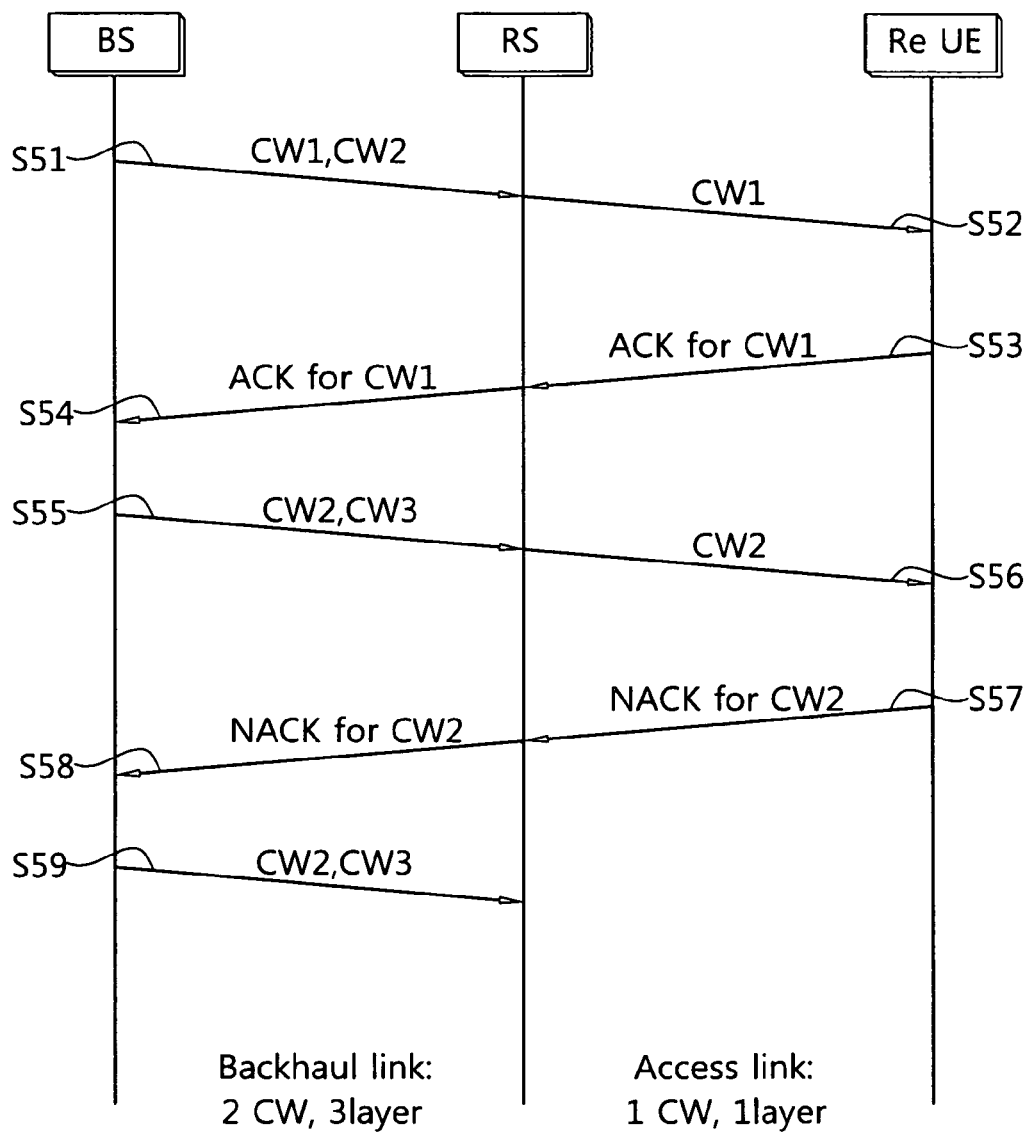
FIG. 5 illustrates a problem arising when the number of transmissible codewords of the backhaul link and that of the access link are not equal.

FIG. 5 illustrates a problem arising when the number of transmissible codewords of the backhaul link and that of the access link are not equal.

With reference to FIG. 5, two codewords can be transmitted in the backhaul link and only one codeword can be transmitted in the access link. Here, it is assumed that the RS is a relay that does not include an independent scheduler like the L1 RS.

When the RS receives the first and second codewords CW1 and CW2 from the BS (S51), because the RS cannot apply the same mapping rule between the codewords and layers as that of the backhaul link, the RS transmits one of the codewords, e.g., the first codeword CW1, to the Re UE (S52). When the RS receives an ACK with respect to the first codeword CW1 (S53), the RS relays the ACK to the BS (S54). In this case, because the BS has not received an ACK/NACK with respect to the second codeword CW2 within an ACK/NACK round trip time (RTT), it retransmits the second codeword CW2 to the RS (S55). Here, the ACK/NACK RTT is a reception time duration of the ACK/NACK with respect to the transmitted codewords. At this time, the BS may also transmit a third codeword CW3. Upon receiving the codewords CW2 and CW3, the RS transmits, for example, only the second codeword CW2 to the Re UE (S56). When the RS receives a NACK with respect to the second codeword CW2, it relays the received NACK to the BS (S58). Then, the BS retransmits the second codeword CW2 and also retransmits the third codeword CW3 (S59). This is because the BS has not received an ACK/NACK with respect to the third codeword CW3 within the ACK/NACK RTT. Thus, in the above-described process, the transmission of the second codeword CW2 in step S51 and the third codeword CW3 in step S55 results in a waste of radio resources of the backhaul link. Thus, a method for solving this problem is required.

Figure 6:
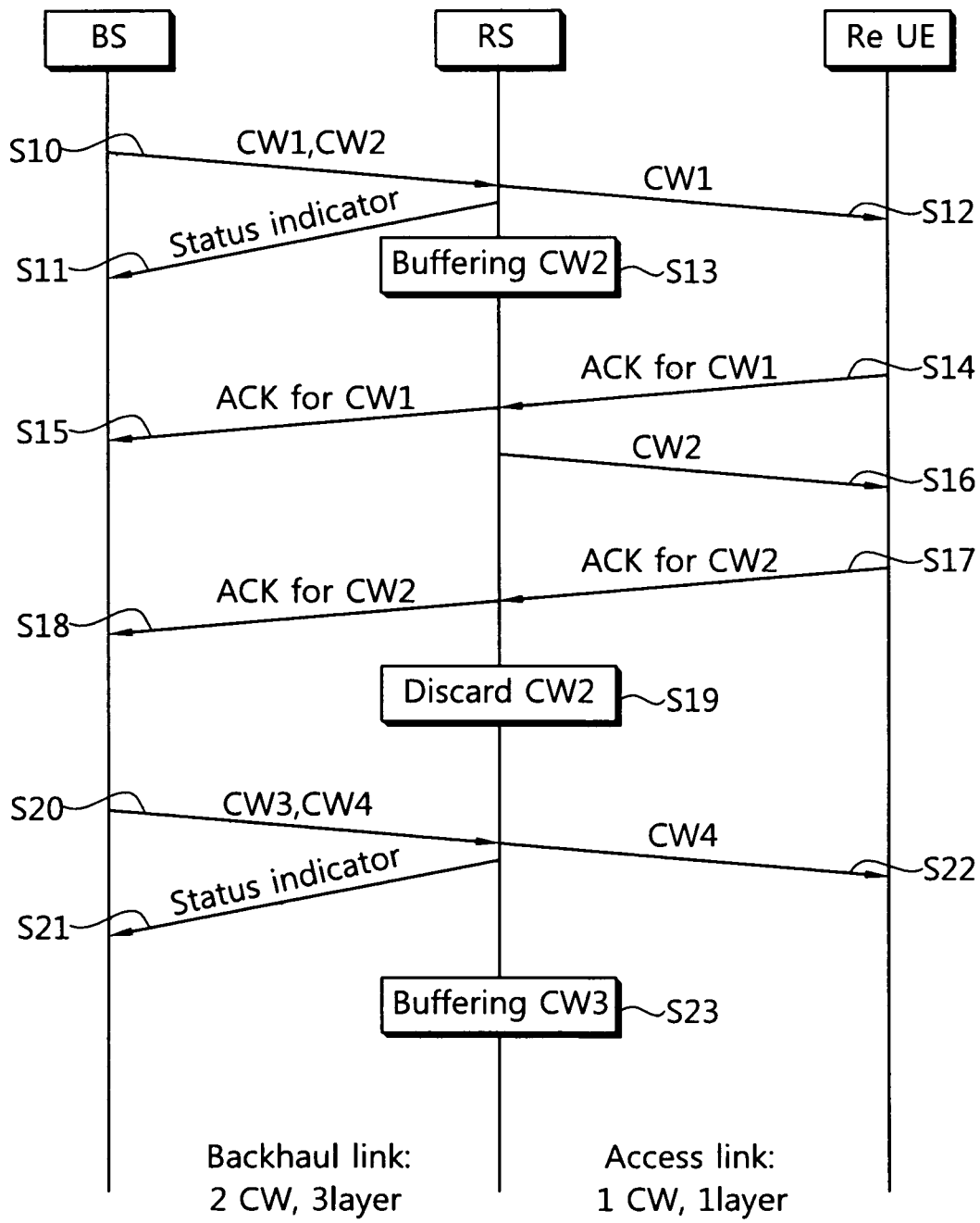
FIG. 6 illustrates HARQ performing method of a relay according to one exemplary embodiment of the present invention.

FIG. 6 illustrates HARQ performing method of a relay according to one exemplary embodiment of the present invention.

With reference to FIG. 6, the BS transmits two codewords CW1 and CW2 to the RS (S10). Upon receiving the CW1 and CW2, the RS transmits a status indicator to the BS (S11).

The status indicator is a signal reporting, by the RS, a status of the RS to the BS. The status indicator may indicate whether or not the RS has received a codeword the BS transmitted and/or whether or not the RS stores at least one of received codewords in a buffer. As the status indicator, a single status indicator with respect to a single codeword may be transmitted, or a plurality of status indicators with respect to a plurality of codewords may be transmitted. Compared with the ACK/NACK informing, by the RS, the BS that whether or not a codeword is to be retransmitted, the status indicator can inform a state of the RS. Also, the status indicator may be used by the RS to inform the BS that the HARQ is to be reconfigured (reset), changed, and/or released. The RS informs the BS about a change in the HARQ configuration (setting) in the backhaul link through the status indicator. For example, although ACK/NACK with respect to a previously transmitted codeword is not received within the predetermined ACK/NACK RTT, the status indicator may serve to inform the BS that retransmission of the codeword is not required. Or, the status indicator may inform the BS that the RS stores a codeword which has been previously transmitted by the BS in a buffer and the codeword has not been merely transmitted yet to the Re UE. Or, an established ACK/NACK RTT may be changed through the status indicator. For example, the ACK/NACK RTT may be changed from 4 ms to 8 ms.

Upon receiving the status indicator from the RS, the BS recognizes that the existing configuration of the HARQ has been changed for the corresponding RS, and although it does not receive ACK/NACK within the ACK/NACK RTT, the BS may not perform retransmission. Or, although the BS receives only an ACK with respect to some among previously transmitted codewords, it may not perform retransmission on the other remaining codewords. Or, the BS may perform HARQ based on a new ACK/NACK RTT which has been changed from the existing ACK/NACK RTT.

The RS transmits a single codeword, e.g., only the first codeword CW1, to the Re UE (S12). In this case, the second codeword CW2 which has not been transmitted to the Re UE is stored in the buffer of the RS (S13). Which one of the two codewords is to be transmitted to the Re UE may be determined according to each priority level of the codewords. If there is no particular priority, the two codewords may be alternately transmitted.

When the RS receives ACK with respect to the transmission of first codeword CW1 from the Re UE (S14), the RS transmits the ACK to the BS (S15). In this case, although ACK/NACK with respect to the second codeword CW2 is not received, the BS does not perform retransmission on the second codeword CW2 based on the previously received status indicator.

The RS transmits the second codeword CW2 stored in the buffer to the Re UE from a corresponding subframe (S16). When the RS receives ACK with respect to the second codeword CW2 from the Re UE (S17), the RS transmits the ACK to the BS (S18), and then empties its buffer (S19). In this case, the buffer of the RS may not be necessarily emptied at this point of time, and may be emptied after new first and second codewords CW1 and CW2 are received.

Upon receiving the ACK with respect to the two codewords from the RS, the BS transmits third and fourth codewords CW3 and CW4 (S20). The RS transmits a status indicator with respect to the third and fourth codewords CW3 and CW4 to the BS (S21) and transmits the fourth codeword CW4 to the Re UE (S22). In this case, the RS stores the third codeword CW3 which has not been transmitted to the Re UE in its buffer (S23).

By transmitting the status indicator by the RS to the BS, even when the number of layers and/or the number of transmissible codewords of the backhaul link and that of the access link are different, traffic can be smoothly made without a waste of resource of the backhaul link in such a manner that the existing HARQ configuration is changed, and some traffic are stored and transmitted at a proper time. The above-described method can be applicable to the L1 RS that cannot perform an independent HARQ process in the access link. This method is effective when the total traffic amount of the backhaul link and that of the access link are similar.

Figure 7:
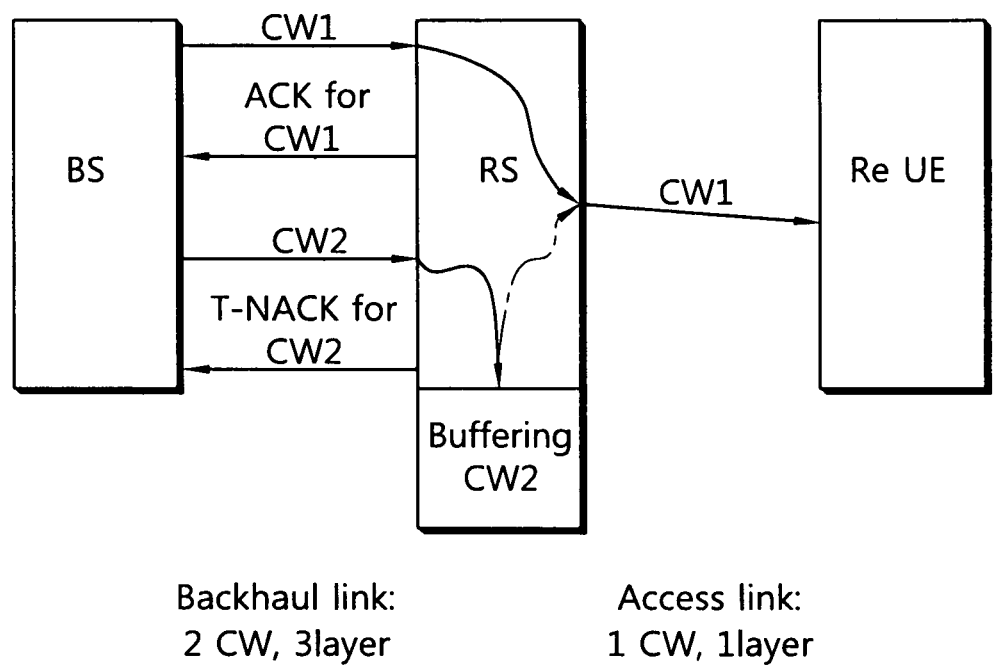
FIG. 7 illustrates HARQ performing method of a relay according to another exemplary embodiment of the present invention.

FIG. 7 illustrates HARQ performing method of a relay according to another exemplary embodiment of the present invention.

The RS and the number of layers and transmissible codewords of the backhaul link and the access link are the same as those in the method described above with reference to FIG. 6. The RS may transmit a status indicator with respect to a codeword stored by the RS in the buffer among a plurality of codewords received from the BS to the BS. When the BS receives such status indicator, it may recognize that the existing HARQ and configuration have been changed, receive ACK/NACK with respect to every transmitted codeword, and then transmit a next codeword.

The RS receives two codewords CW1 and CW2 from the BS and transmits ACK with respect to one codeword, e.g., the first codeword CW1, and transmits a T-NACK (Temporary-NACK) with respect to another codeword, e.g., the second codeword CW2. Unlike the generally used NACK, the T-NACK may be a signal informing that the RS stores the second codeword CW2. Upon receiving the T-NACK, the BS may not re-transmit the second codeword CW2. Accordingly, radio resource of the backhaul link cannot be wasted. Namely, the T-NACK is an example of the status indicator.

The RS transmits only the first codeword CW1, for which ACK has been transmitted to the BS, to the Re UE, and stores the second codeword CW2, for which the T-NACK has been transmitted to the BS, in the buffer. The RS transmits the second codeword CW2 to the Re UE at a time point when its transmission is available, and when the RS receives ACK/NACK from the Re UE, it relays the received ACK/NACK to the BS.

If the RS cannot perform the function of storing the second codeword CW2, the RS may intentionally transmit NACK with respect to the second codeword CW2, receive the second codeword CW2 which has been retransmitted from the BS, transmit ACK to the BS, and then transmit the second codeword CW2 to the Re UE.

If the RS can perform an independent scheduling function, for example, if the RS has the function more than that of the L2 RS and can use the MU-MIMO, the RS may be operated in the following manner when the number of layers of the backhaul link and that of the access link are not equal.

Figure 8:
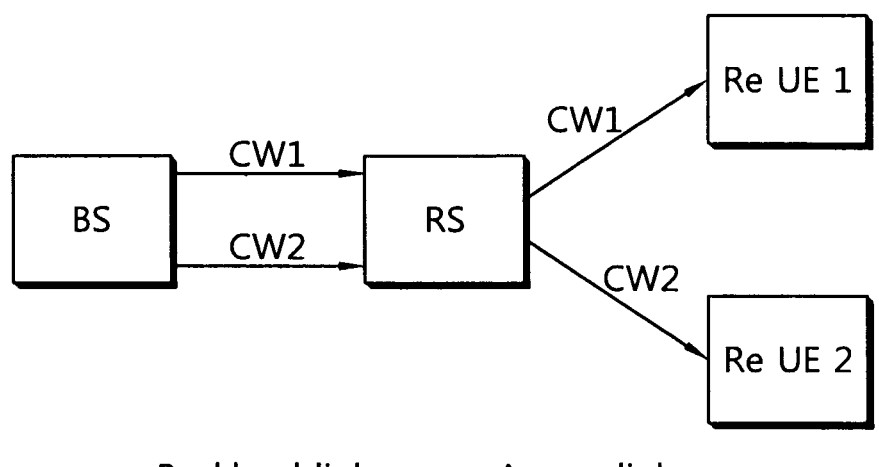
FIG. 8 illustrates an example of an operation of the relay when the number of layers of the backhaul link and that of the access link are not equal.

FIG. 8 illustrates an example of an operation of the relay when the number of layers of the backhaul link and that of the access link are not equal.

The case where the backhaul link has three layers and two transmissible codewords, while the access link has one layer and one transmissible codeword is considered. In this case, the BS may use the second mapping rule in the backhaul link. Namely, the BS maps one codeword CW1 to a first layer and the other codeword CW2 to the second and third layers, and transmits the same to the RS. The RS maps the first codeword CW1 to the first layer and transmits it to a Re UE 1 in the access link with the Re UE1 and maps the second codeword CW2 to the first and second layers and transmits the same to a Re UE 2 in the access link with the Re UE2. Namely, the RS receives the two codewords from the BS, demodulates them, maps the codewords to the layers, and transmits the first codeword CW1 to the Re UE1 and, at the same time, transmits the second codeword CW2 to the Re UE2.

In other words, when layers of the backhaul link and those of the access link are unsymmetrical in their number, a set of Re UEs including Re UEs smaller than the number of layers that can be stably obtained in the backhaul link is configured, and a codeword is transmitted to the Re UEs included in the Re UE set by using the MU-MIMO, thus effectively transmitting the codeword to each Re UE without wasting the link resource.

The operation of the RS described above with reference to FIG. 8 cannot be applicable if the RS is the L1 RS. L1 RS cannot perform mapping between codewords and layers of the access link if they are not equal to those of the backhaul link. Hereinafter, the case where the number of layers of the backhaul link and that of the access link are not symmetrical and the RS is the L1 RS will now be described.

Figure 9:
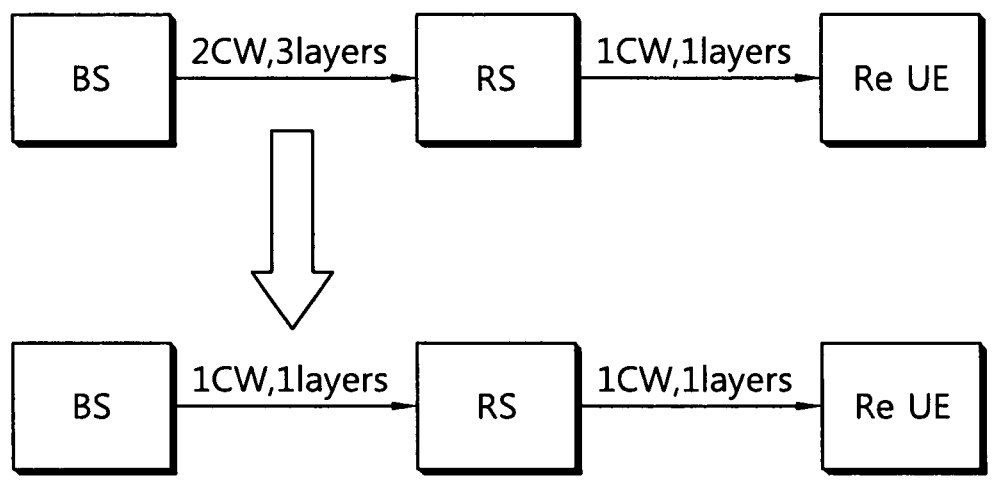
FIG. 9 illustrates another example of an operation of the relay when the number of layers and/or the number of transmissible codewords of the backhaul link and that of the access link are not equal.

FIG. 9 illustrates another example of an operation of the relay when the number of layers and/or the number of transmissible codewords of the backhaul link and that of the access link are not equal.

With reference to FIG. 9, the case where the backhaul link has three layers and two transmissible codewords and the access link has one layer and one transmissible codeword is considered. In this case, the BS may determine the number of codewords to be transmitted to the RS based on one with a smaller number of layers among the backhaul link and the access link. Namely, because the number of the layers of the access link is smaller and the value is 1, the BS may transmit only one codeword to the RS.

In the above-described method, the backhaul link has good channel quality which is highly likely to be uniform, so the number of codewords to be transmitted by the BS is calculated mainly according to the number of layers of the access link. Then, the two links continued from BS-RS-Re UE can be handled like one link. In the above-described method, the RS immediately relays the received codeword to the Re UE, so a processing process such as new codeword-to-layer mapping in the access link can be omitted. Thus, it is effective when the RS performs only the function of the L1 RS. However, the RS may not be necessarily the L1 relay, because the L2 and L3 relays can also perform the same function as that of the L1 relay according to a situation.

Hereinafter, a channel information feedback method of the relay in the wireless communication system including the relay will now be described. Here, channel information may include a channel quality indicator (CQI) indicating a channel quality, a precoding matrix index (PMI) indicating an index of a MIMO preprocessing matrix, a rank indication (RI) informing about a channel rank, and the like, but without being limited thereto.

Figure 10:
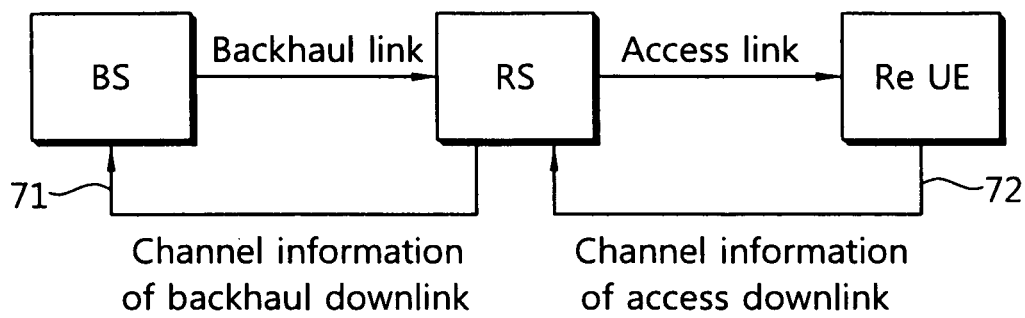
FIG. 10 illustrates a channel information feedback method when the relay performs a function of more than an L2 RS.

FIG. 10 illustrates a channel information feedback method when the relay performs a function of more than the L2 relay.

With reference to FIG. 10, the backhaul link and the access link may include a MIMO channel, respectively. In this case, channel information of the backhaul downlink is measured by the RS and fed back to the BS (71), and channel information of the access downlink is measured by the Re UE and fed back to the RS (72). Namely, the channel information are independently measured and fed back in the backhaul downlink and the access downlink. In the backhaul downlink, a channel state is not likely to be changed, so a channel information update period may be very large. Meanwhile, in the access downlink, the channel state can be frequently changed, its channel information update period is preferably short. Then, the MIMO channel can be utilized to its maximum level.

However, if the RS cannot perform an independent scheduling function like the L1 relay, the above-described method, namely, the method in which the channel information of the backhaul link and the access link are independently measured and fed back cannot be properly applied.

Figure 11:
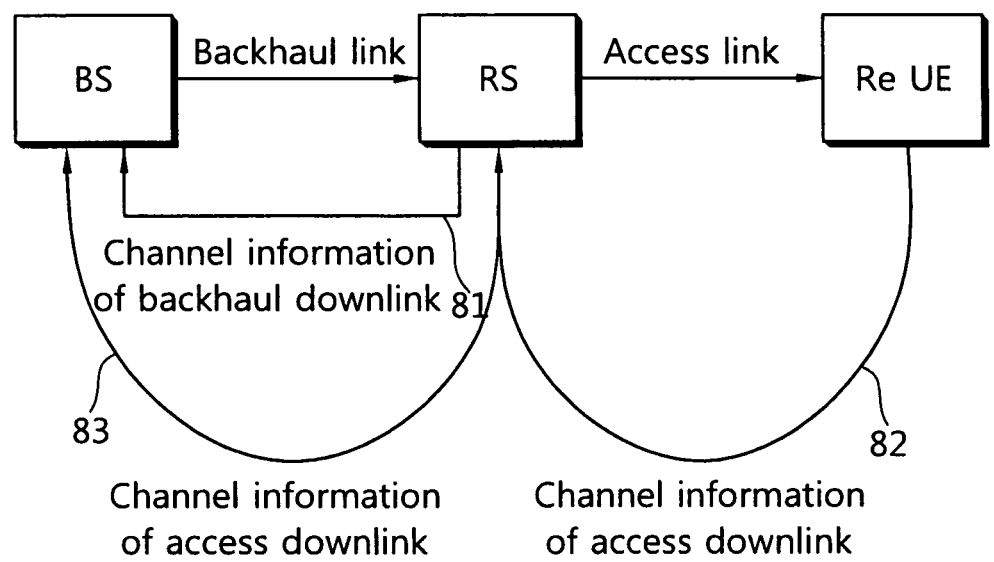
FIG. 11 illustrates a channel information feedback method when the relay does not perform an independent scheduling function.

FIG. 11 illustrates a channel information feedback method when the relay does not perform an independent scheduling function.

With reference to FIG. 11, the RS measures channel information regarding the backhaul downlink and feeds it back to the BS (81). Also, the RS receives channel information regarding the access downlink transmitted by the Re UE (82) and relays it to the BS (83). In consideration of the fact that the link resource of the backhaul link is limited compared with the access link, it is not preferred to transmit all the channel information regarding the backhaul downlink and the channel information regarding the access downlink from the backhaul link.

Figure 12:
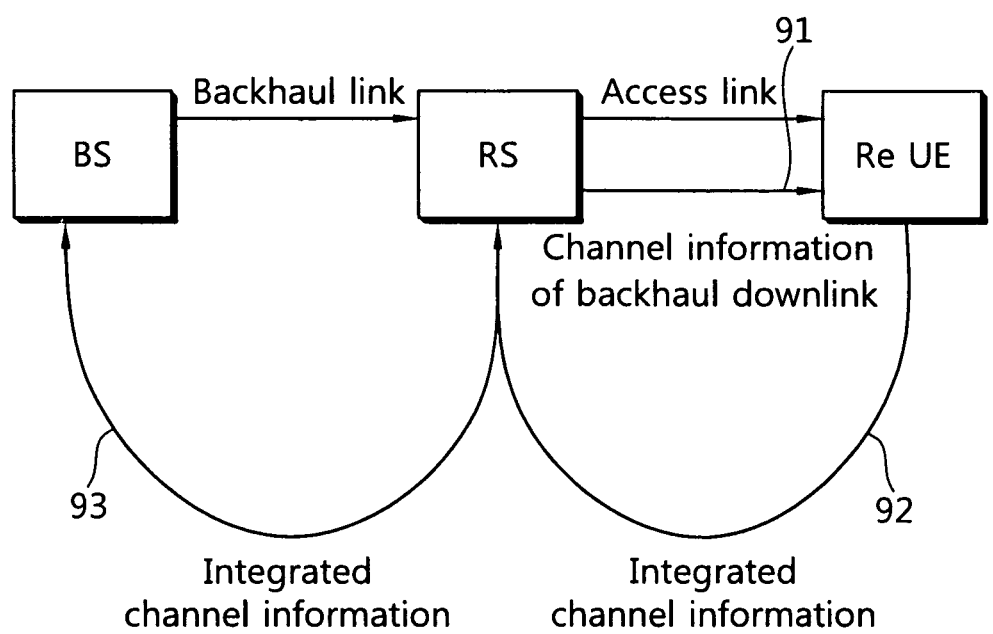
FIG. 12 illustrates a channel information feedback method when the relay does not perform an independent scheduling function according to an exemplary embodiment of the present invention.

FIG. 12 illustrates a channel information feedback method when the relay does not perform an independent scheduling function according to an exemplary embodiment of the present invention.

With reference to FIG. 12, the RS receives a signal from the BS and transmits a channel parameter set required for calculating channel information regarding the backhaul downlink to the Re UE (91). Parameters included in the channel parameter set may include, for example, information indicating a propagation attenuation degree of the backhaul link, the number of layers of the backhaul downlink, a gain value in the RS, and the like. Or, a simple form of signaling that may represent such parameters may be used for the channel parameter.

The Re UE may receive the signal from the RS and calculate channel information regarding the access downlink. The Re UE generates integrated channel information by using the channel information regarding the access downlink and the above-mentioned channel parameter set. Namely, the integrated channel information is channel information generated by regarding the two radio channels continued from BS-RS-Re UE as a single radio channel.

For example, the case where the Re UE includes a reception signal power value in the integrated channel information will now be described. It is assumed that transmission power 'A' of the BS is 100, information indicating the propagation attenuation degree of the backhaul link is given as a channel gain 'B' of the backhaul link and 'B' is 60, a gain value 'C' at the RS is 50, and a channel gain 'D' at the access link is 70.

Then, the reception signal power value fed back by the Re UE is given as A−B+C−D=100−60+50−70=20.

The Re UE feeds back the integrated channel information to the RS (92). Then, the RS relays the integrated channel information to the BS (93). In this case, the RS may bypass the integrated channel information which has been received from the Re UE as it is to the BS.

Figure 13:
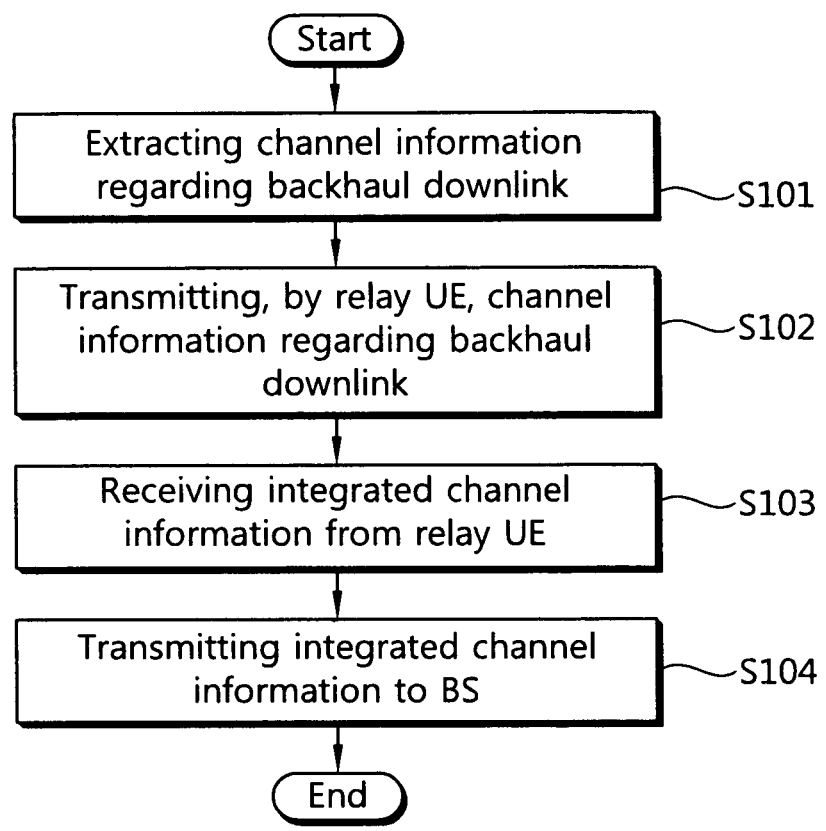
FIG. 13 is a flow chart illustrating the process of a channel information feedback method of a relay when the relay does not perform an independent scheduling function.

FIG. 13 is a flow chart illustrating the process of a channel information feedback method of a relay when the relay does not perform an independent scheduling function. The method described above with reference to FIG. 12 will now be described at the side of the relay.

The RS receives a signal from the BS and extracts channel information regarding the backhaul downlink (S101). The channel information regarding the backhaul downlink may be the channel parameter set as described above. The RS transmits the channel information regarding the backhaul downlink to the Re UE (S102). And, when the RS receives the integrated channel information from the Re UE (S103), the RS transmits the received integrated channel information to the BS (S104).

Hereinafter, a method for processing a transport block in the wireless communication system including a relay will now be described.

In case of a single antenna system, a single transport block is transmitted from the BS to the Re UE through the backhaul link and the access link. If the RS performs only such function as that of the L1 relay, a transport block of the same size is included in a resource block of the same size and transmitted in the backhaul link and the access link. This is because the RS does not have the scheduling function of reconfiguring the transport block and resource reallocation. If the RS can perform the function more than that of the L2 relay, a transport block of a different size may be transferred in the backhaul link and the access link or may be included in a resource block of a different size and transmitted. This is because the RS has a scheduler that is capable of allocating resource based on the channel information of the backhaul link and the access link.

In case of a multi-antenna system, a plurality of transport blocks may be transmitted from the BS to the Re UE through the backhaul link and the access link. If the RS performs only the same function as that of the L1 relay, it is preferred that a transport block of a size which has been once determined is transmitted as it is in a resource block of the same size. To this end, it is preferred for the number of transmissible codewords of the backhaul link and that of the access link to be equal, for which the method described above with reference to FIG. 9 can be used.

If the RS is able to perform a function more than that of the L2 relay, each link may be independently operated such that a different number of codewords can be transmitted by using mutually different channel quality of each link to its maximum level (This RS is different from the L1 relay which is restricted to transmit the same number of codewords although the backhaul link and the access link have different channel quality). By doing that, the backhaul link can be effectively used, and likewise, the access link can be also effectively used. For this purpose, however, the BS should necessarily perform an additional processing process. Namely, the BS is required to additionally map different number of codewords, or perform dropping, buffering, and the like.

Hereinafter, the case where the RS has the function of the L1 relay and the function of separating/reconfiguring a transport block will now be described. Namely, the RS does not perform an independent scheduling function but perform the function of separating/reconfiguring a transport block.

Figure 14:
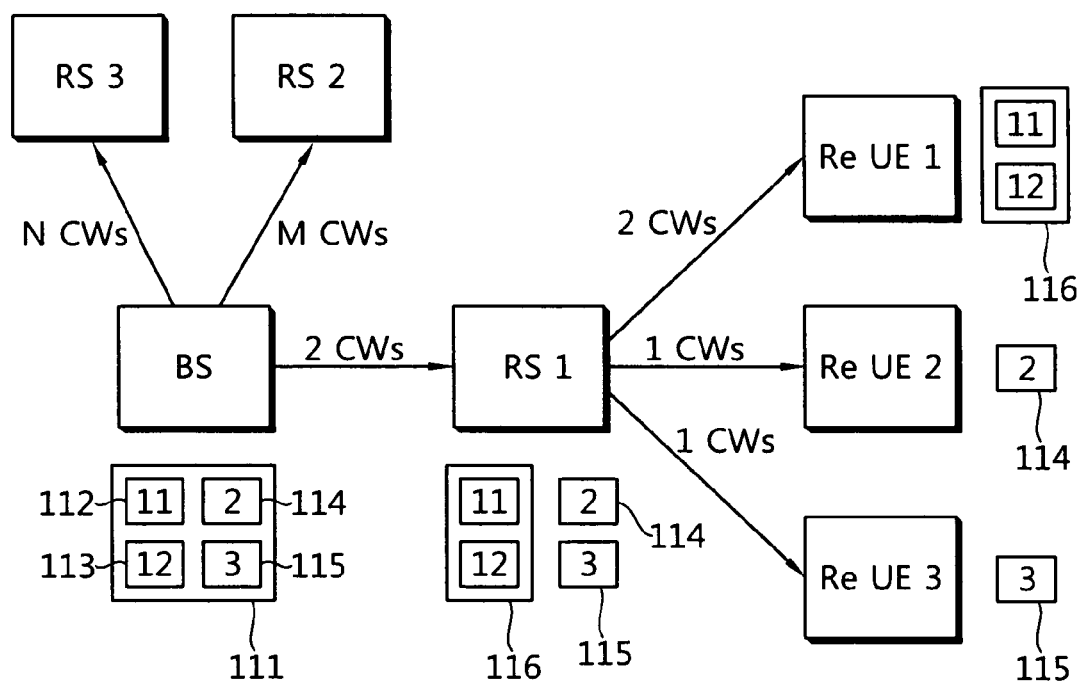
FIG. 14 illustrates a transport block processing method according to an exemplary embodiment of the present invention.

FIG. 14 illustrates a transport block processing method according to an exemplary embodiment of the present invention.

With reference to FIG. 14, the BS multiplexes a plurality of transport blocks 112, 113, 114, and 115 to be transmitted to one relay, e.g., a first relay RS 1, to form a single multiplexed block 111. The multiplexed block 111 is transmitted to the first relay RS 1 through the backhaul downlink between the BS and the first relay RS 1. An example of the configuration of the multiplexed block 111 will be described later.

The first relay RS 1 classifies the multiplexed block 111 into control information and data by the Re UEs. Namely, the first relay RS 1 classifies the multiplexed block 111 into a transport block 116 to be transmitted to a first Re UE 1, a transport block 114 to be transmitted to a second Re UE 2, and a transport block 115 to be transmitted to a Re UE 3, and transmits them to each Re UE.

Figure 15:
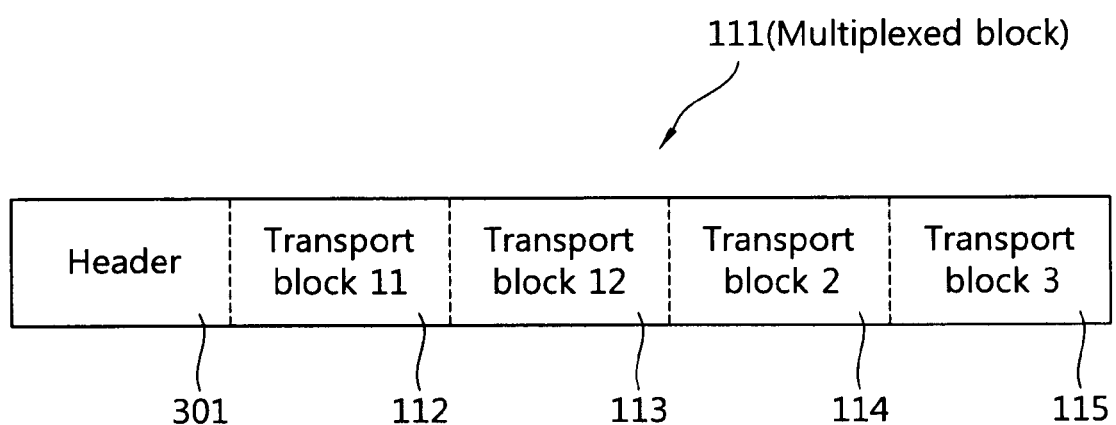
FIG. 15 illustrates the configuration of a multiplexed block.

In the above-described method, in the backhaul downlink transmission, the BS handles each RS like a single UE and performs transmission in the same manner as the method of transmitting a plurality of codewords in the downlink transmission between the BS and UE FIG. 15 illustrates the configuration of a multiplexed block.

With reference to FIG. 15, the multiplexed block 111 may include a header 301 and a plurality of transport blocks 112, 113, 114, and 115. The header 301 may include information indicating how the plurality of transport blocks 112, 113, 114, and 115 have been multiplexed. In addition, the header 301 may include information allowing conforming whether or not the multiplexed block is transmitted to the RS itself, by being masked with an ID of the RS.

Figure 16:
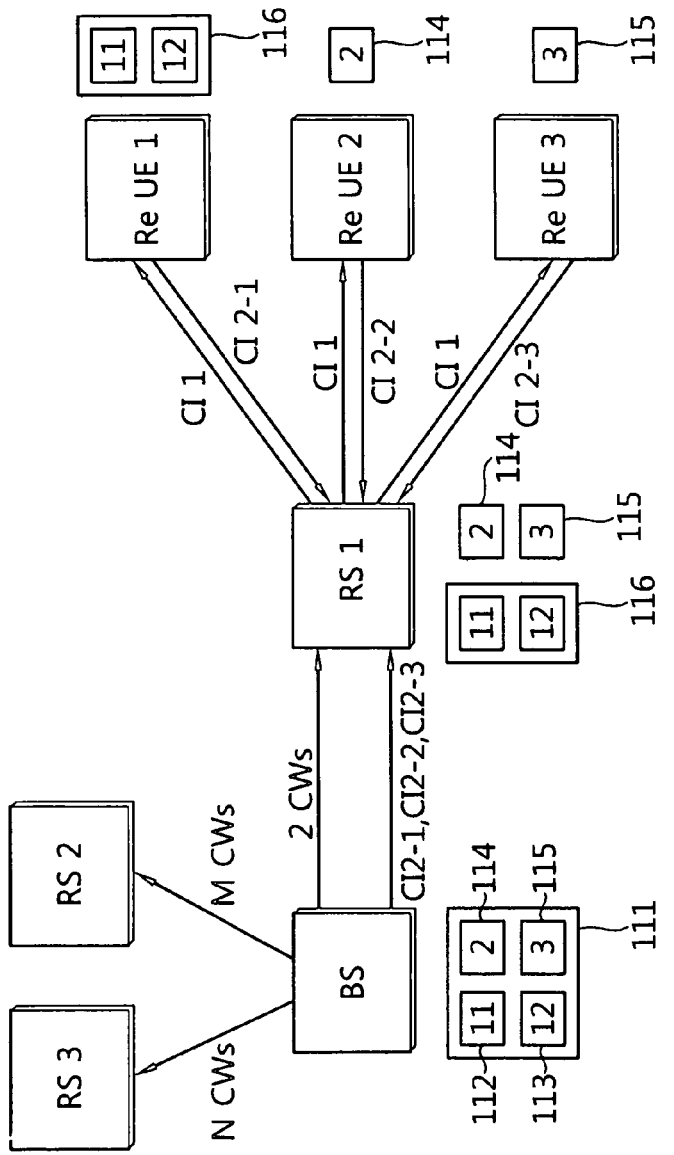
FIG. 16 illustrates channel information feedback method in case of using a MIMO in the wireless communication system.

FIG. 16 illustrates a channel information feedback method in case of using the MIMO in the wireless communication system.

With reference to FIG. 16, the RS 1 transmits channel information CI 1 regarding the backhaul downlink to the Re UEs 1, 2, and 3 connected to the RS 1. In this case, the channel information CI 1 may be a channel parameter set with respect to the backhaul downlink. Each Re UE calculates channel information regarding the access downlink, and generates integrated channel information by using the channel information regarding the access downlink and the above-described channel parameter set. FIG. 13 shows the integrated channel information CI2-1, CI2-2, and CI2-3. The RS 1 receives the integrated channel information from the Re UEs 1 to 3, and then relays the received integrated channel information to the BS. In this case, the RS may relay the integrated channel information, namely, CI2-1, CI2-2, and CI2-3, to the BS as it is the RS has received from each Re UE, or may reduce signaling overhead through a certain processing process and transmit the same. In this case, the integrated channel information may be information that has undergone a compression process by using a channel change in a space, time and frequency. In addition, various methods may be applied to the integrated channel information transmitted by each Re UE in order to reduce the signaling overhead.

Recognizing the channel state regarding the BS-RS 1-Re UEs 1, 2, and 3 based on the integrated channel information, the BS can properly perform scheduling.

Unless the amount of traffic between the BS and the RS 1 and that between the RS 1 and the Re UEs 1, 2, and 3 are appropriately controlled, a bottleneck phenomenon may occur at a particular link or radio resources may be wasted. Thus, in order to prevent such phenomenon, the BS scheduler preferably knows a portion or the entirety of the channel information regarding the backhaul link and the access link. This may be applied for a single-antenna system, not the MIMO, alike.

Figure 17:
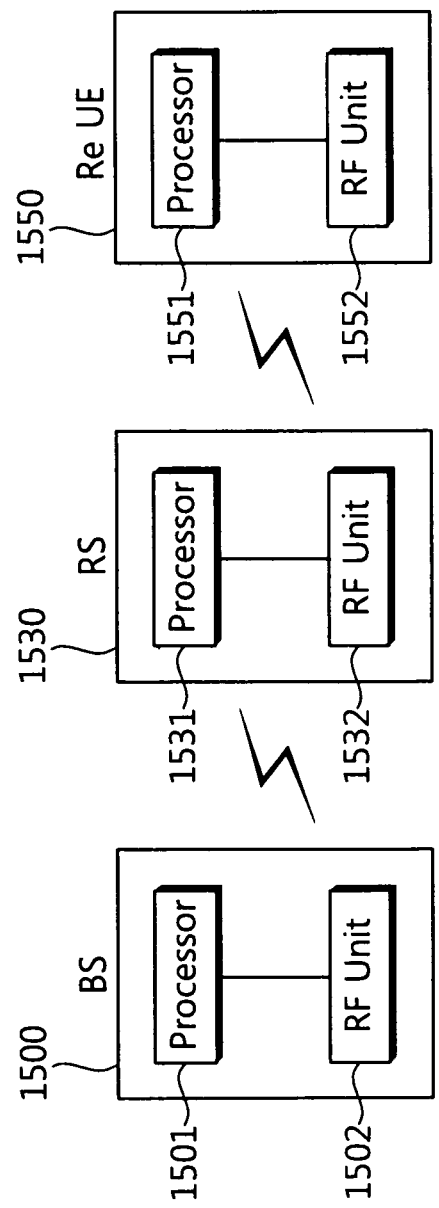
FIG. 17 is a schematic block diagram illustrating the wireless communication system in which the exemplary embodiments of the present invention may be implemented.

FIG. 17 is a schematic block diagram illustrating the wireless communication system in which the exemplary embodiments of the present invention may be implemented. A BS 1500, an RS 1530, and an Re UE 1550 communicate through a radio channel, respectively.

The BS 1500 includes a processor 1501 and an RF unit 1502. The RF unit 1502 transmits and/or receives a radio signal. The processor 1501 is connected with the RF unit 1502 to transmit data to the RS 1530. The processor 1501 implements a data transmission method according to the exemplary embodiments as described above.

The RS 1530 includes a processor 1531 and an RF unit 1532. The RF unit 1532 transmits and/or receives a radio signal. The processor 1531 is connected with the RF unit 1532 to relay data received from the BS 1500 to the Re UE 1550. The processor 1531 implements the HARQ performing method of the relay and/or the channel information feedback method of the relay according to the exemplary embodiments as described above.

The Re UE 1550 includes a processor 1551 and an RF unit 1552. The RF unit 1552 transmits and/or receives a radio signal. The processor 1551 is connected to the RF unit 1552 to receive data relayed from the RS 1530 and generate channel information, e.g., integrated channel information.

The preferred embodiments of the present invention have been described with reference to the accompanying drawings, and it will be apparent to those skilled in the art that various modifications and variations can be made in the present invention without departing from the scope of the invention. Thus, it is intended that any future modifications of the embodiments of the present invention will come within the scope of the appended claims and their equivalents.

What is claimed is:

1. A channel information feedback method of a relay station (RS), the method comprising:
   extracting a set of channel parameters required for calculating channel state of a backhaul channel by using a first signal received from a base station (BS), wherein the backhaul channel is a channel between the BS and the RS;
   transmitting the set of channel parameters and a second signal to a relay user equipment (Re UE) connected to the RS through an access channel, wherein the access channel is a channel between the RS and the Re UE;
   receiving integrated channel information from the Re UE; and
   transmitting the integrated channel information to the BS,
   wherein the integrated channel information is channel information generated by regarding the backhaul channel and the access channel as a single radio channel,
   wherein the integrated channel information is generated by combining backhaul channel information and access channel information,
   wherein the backhaul channel information is calculated by the set of channel parameters and the access channel information is estimated by the second signal, and
   wherein the backhaul channel information, the access channel information and the integrated channel information are generated by the Re UE.

2. A channel information feedback method of a relay user equipment (Re UE), the method comprising:
   receiving a set of channel parameters required for calculating channel state of a backhaul channel from a relay station (RS), wherein the backhaul channel is a channel between a base station (BS) and the RS;

receiving a second signal required for estimating an access channel from the RS, wherein the access channel is a channel between the RS and the Re UE;

generating integrated channel information; and transmitting the integrated channel information to the RS, wherein the integrated channel information is channel information generated by regarding the backhaul channel and the access channel as a single radio channel, wherein the integrated channel information is generated by combining backhaul channel information and access channel information, wherein the backhaul channel information is calculated by the set of channel parameters and the access channel information is estimated by the second signal, and wherein the backhaul channel information, the access channel information and the integrated channel information are generated by the Re UE.

3. The method of claim 2, wherein the set of channel parameters comprises at least one of parameters indicating a propagation attenuation degree of the backhaul channel, a number of layers of the backhaul channel, and a gain value in the RS.

4. The method of claim 1, wherein the set of channel parameters comprises at least one of parameters indicating a propagation attenuation degree of the backhaul channel, a number of layers of the backhaul channel, and a gain value in the RS.

5. The method of claim 1, wherein a size of a first transport block comprising the first signal is always same to a size of a second transport block comprising the second signal.

6. An apparatus comprising:

a radio frequency (RF) unit transmitting and receiving radio signals; and a processor connected to the RF unit, wherein the processor is configured for:

receiving a set of channel parameters required for calculating channel state of backhaul channel from a relay station (RS), wherein the backhaul channel is a channel between a base station (BS) and the RS;

receiving a second signal required for estimating an access channel from the RS, wherein the access channel is a channel between the RS and the Re UE;

generating integrated channel information; and transmitting the integrated channel information to the RS, wherein the integrated channel information is channel information generated by regarding the backhaul channel and the access channel as a single radio channel, wherein the integrated channel information is generated by combining backhaul channel information and access channel information, wherein the backhaul channel information is calculated by the set of channel parameters and the access channel information is estimated by the second signal, and wherein the backhaul channel information, the access channel information and the integrated channel information are generated by the Re UE.

* * * * *